United States Patent [19]
Curtin

[11] 3,971,574
[45] July 27, 1976

[54] PIPE COUPLING

[76] Inventor: Hoyt S. Curtin, 10477 Laramie Ave., Chatsworth, Calif. 91311

[22] Filed: Dec. 30, 1974

[21] Appl. No.: 537,093

Related U.S. Application Data

[63] Continuation-in-part of Ser. No. 329,727, Feb. 5, 1973, Pat. No. 3,857,588.

[52] U.S. Cl. ................................. 285/31; 285/330; 285/423; 285/DIG. 16
[51] Int. Cl.² ......................................... F16L 13/10
[58] Field of Search ............... 285/31, 32, 294, 297, 285/DIG. 16, 423, 330

[56] References Cited
UNITED STATES PATENTS

| | | | |
|---|---|---|---|
| 339,036 | 3/1886 | Wilbur | 285/294 |
| 556,106 | 3/1896 | Schiele | 285/31 |
| 2,933,428 | 4/1960 | Mueller | 285/423 X |
| 3,826,521 | 7/1974 | Wilhelmsen | 285/31 X |

FOREIGN PATENTS OR APPLICATIONS

| | | | |
|---|---|---|---|
| 1,040,858 | 10/1958 | Germany | 285/423 |
| 11,098 | 5/1894 | United Kingdom | 285/297 |
| 933,560 | 8/1963 | United Kingdom | 285/423 |
| 1,117,802 | 6/1968 | United Kingdom | 285/31 |

*Primary Examiner*—Thomas F. Callaghan
*Attorney, Agent, or Firm*—Lindenberg, Freilich, Wasserman, Rosen & Fernandez

[57] ABSTRACT

A coupling for unthreaded pipes of a sprinkler system, which permits the replacement of a small damaged pipe section without bending the pipes already emplaced in the ground. One coupling includes a short pipe section having an enlaged tubular portion fixed at one end thereof adapted to be fitted over and adhered to a first open end of the pipe in the ground. A slidable sleeve on a second end of the pipe section has an enlarged tubular portion adapted to be fitted over and adhered to a second open end of the pipe in the ground.

2 Claims, 17 Drawing Figures

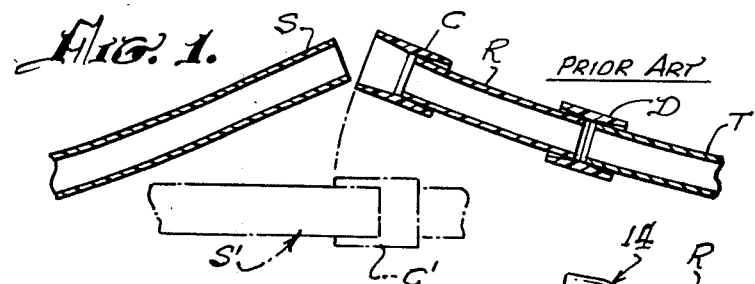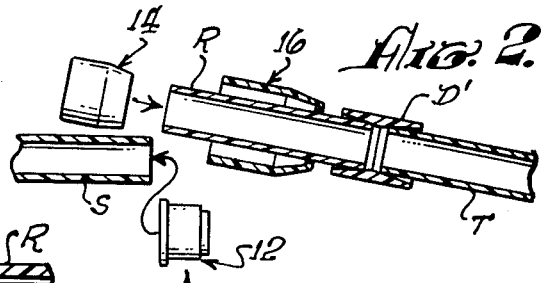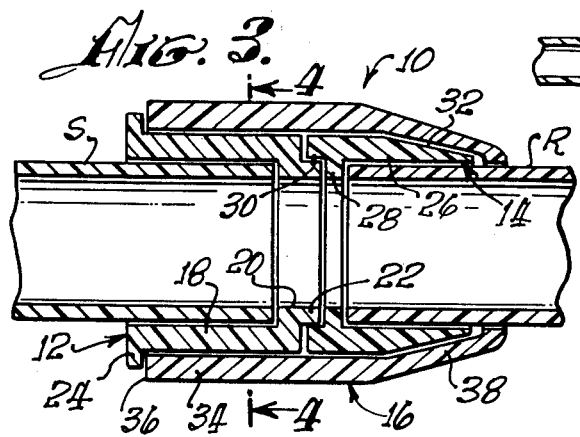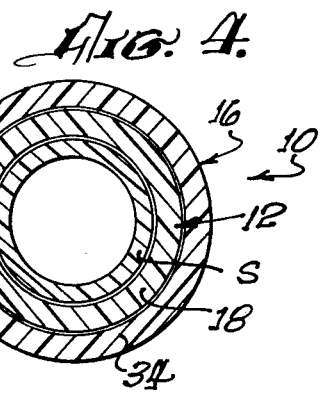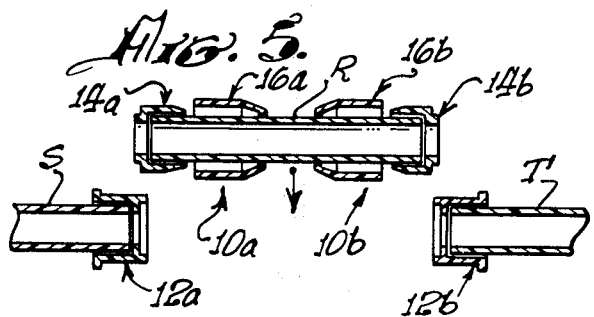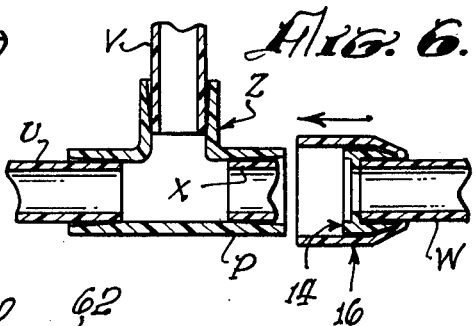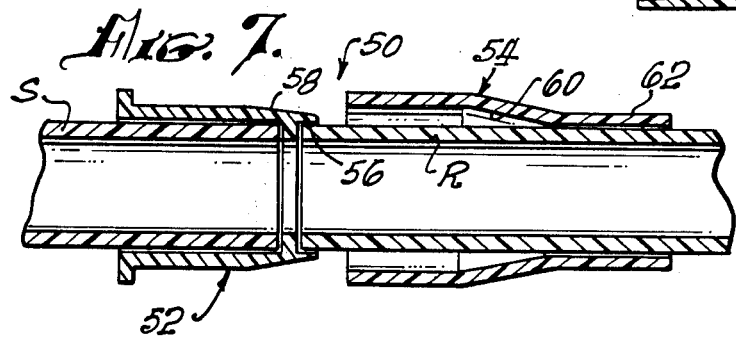

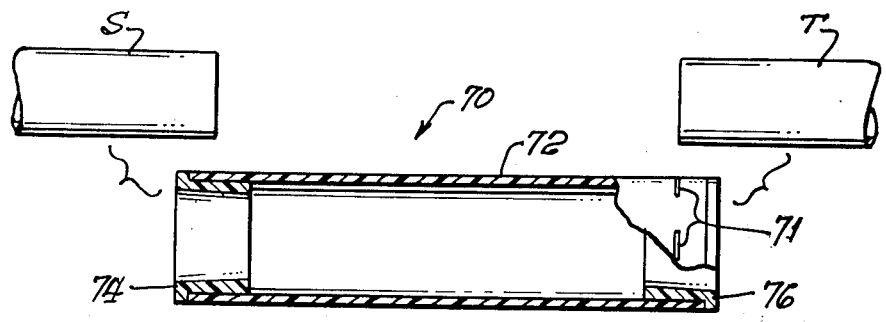
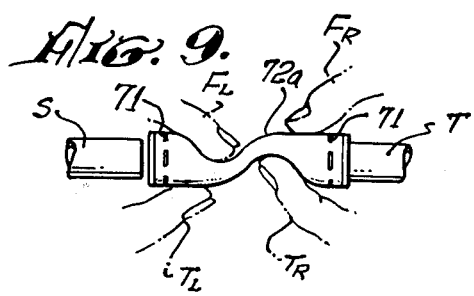
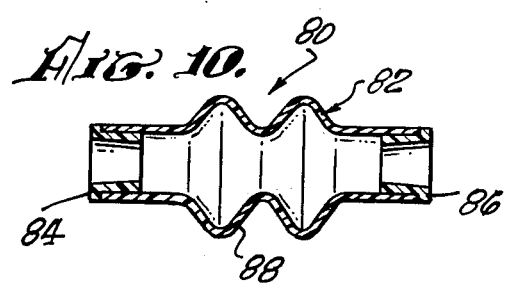
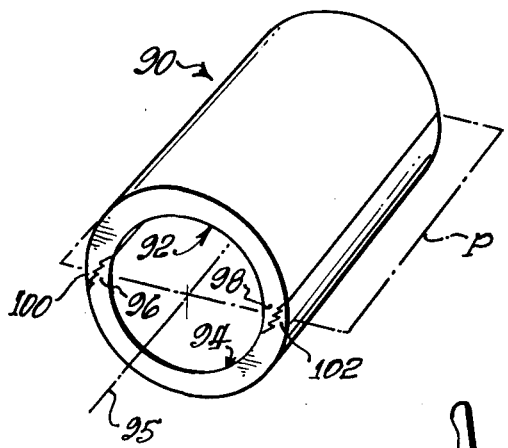
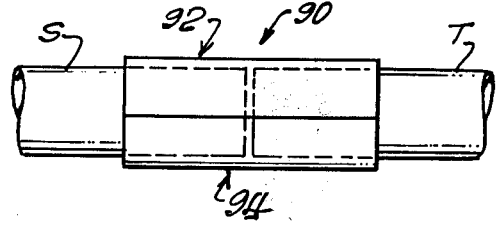
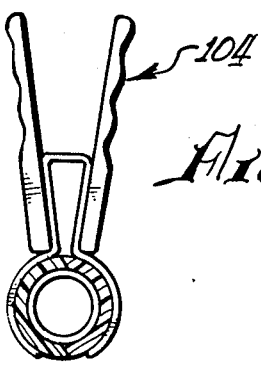

PIPE COUPLING

RELATED APPLICATIONS

This application is a continuation-in-part of U.S. patent application Ser. No. 329,727, filed Feb. 5, 1973 now U.S. Pat. No. 3,857,588.

BACKGROUND OF THE INVENTION

This invention relates to pipe couplings, and more particularly to pipe couplings that are usable with unthreaded pipes.

Plastic pipes have become widely used in sprinkler systems because of their low cost and ease of connection and repair. Such pipes, commonly referred to as PVC because of their typical polyvinyl chloride composition, may be joined without threading by applying an adhesive such as a solvent cement type to the ends of the pipes and slipping a smooth-bore coupling over the ends.

When a break occurs in an underground sprinkler system of the PVC type, it can be repaired by digging away the dirt over the break, cutting out a small section of pipe containing the break, and connecting a new section of pipe in place using a pair of couplings. In pratice, however, great difficulty is encountered in installing the couplings. The couplings can be installed by bending the pipe in the ground far enough so that the gap between them is increased sufficiently to insert the pipes into the couplings, and then releasing the bent pipes so they return to their original straight configuration. However, the dirt around a long section of the pipes may have to be removed to permit sufficient bending, which involves considerable labor and which may not be possible in certain locations. Also, the glue on the pipe may be scraped away while the pipe is fitted into the coupling. A coupling which could be installed without requiring large amounts of pipe bending would facilitate repairs in such sprinkler systems.

SUMMARY OF THE INVENTION

In accordance with one embodiment of the present invention, a pipe coupling is provided for use with unthreaded pipes, which provides a reliable connection without requiring bending of pipes that are fixed in position in the ground. The coupling includes a short pipe section having an enlarged tubular portion fixed at one end thereof and a sleeve slidable on the pipe section adjacent a second end thereof. The sleeve also includes an enlarged tubular portion. In use, a section of the damaged pipe, substantially equal in length to the short pipe section, is removed to thereby leave open first and second pipe ends in the ground. The fixed enlarged tubular portion is adhered to the open first pipe end. The sleeve is slid over and adhered to the open second pipe end.

In another coupling of the invention, a flexible coupling sleeve is provided which has rigid inserts at either end. The sleeve is of a flexible material such as a vinyl with plasticizer. Such a material may require considerable time such as hours to form a solvent cement bond with the more rigid PVC material containing less plasticizer which is typically used in sprinkler system pipes. The inserts are of the more rigid PVC material and can be bonded by solvent cement to typical sprinkler pipes in a short period of time such as less than 20 minutes. The coupling is installed by bending the sleeve thereof considerably so that no bending of the emplaced pipes is required. Even greater flexibility can be obtained by utilizing a flexible sleeve which is formed as a bellows. In still another embodiment of the invention, a coupling is provided which is formed from two half-cylindrical sections that can be brought together while their ends receive the ends of pipes to be coupled. Each section has sawtoothed edges so that the parts tend to hold themselves in place while cement applied thereto is drying.

The novel features of the invention are set forth with particularity in the appended claims. The invention will best be understood from the following description when read in conjunction with the accompanying drawings.

BRIEF DESCRIPTION OF THE DRAWINGS

FIG. 1 is a sectional side view of a pipe and coupling of the prior art, showing how the coupling was installed in the prior art;

FIG. 2 is a sectional side view of a pipe coupling constructed in accordance with one embodiment of the present invention, showing the manner of installation in a pipe system;

FIG. 3 is a sectional side view of the coupling of FIG. 2, showing it completely installed on the pipe system;

FIG. 4 is a view taken on the line 4—4 of FIG. 3;

FIG. 5 is a sectional side view of an assembly constructed in accordance with the coupling of FIG. 3, but showing installation in a situation where substantially no bending of the emplaced pipes is possible;

FIG. 6 is a sectional side view of a portion of the coupling of FIG. 3, showing its employment in connection with a T-connector that has a broken pipe end lodged therein; and FIG. 7 is a sectional side view of a pipe coupling constructed in accordance with another embodiment of the invention.

FIG. 8 is a sectional view of a coupling constructed in accordance with still another embodiment of the invention;

FIG. 9 is a side elevation view of the coupling of FIG. 8, showing the manner in which it is installed on a pipe line;

FIG. 10 is a sectional side view of a coupling constructed in accordance with yet another embodiment of the invention;

FIG. 11 is a perspective view of a coupling constructed in accordance with yet another embodiment of the invention;

FIG. 12 is a side elevation view of the coupling of FIG. 11, showing it installed in a pipe line;

FIG. 13 is a sectional end view of the coupling of FIG. 11, showing how a clamp is applied to hold it together while cement thereon is drying;

DESCRIPTION OF THE PREFERRED EMBODIMENTS

Figure 14:
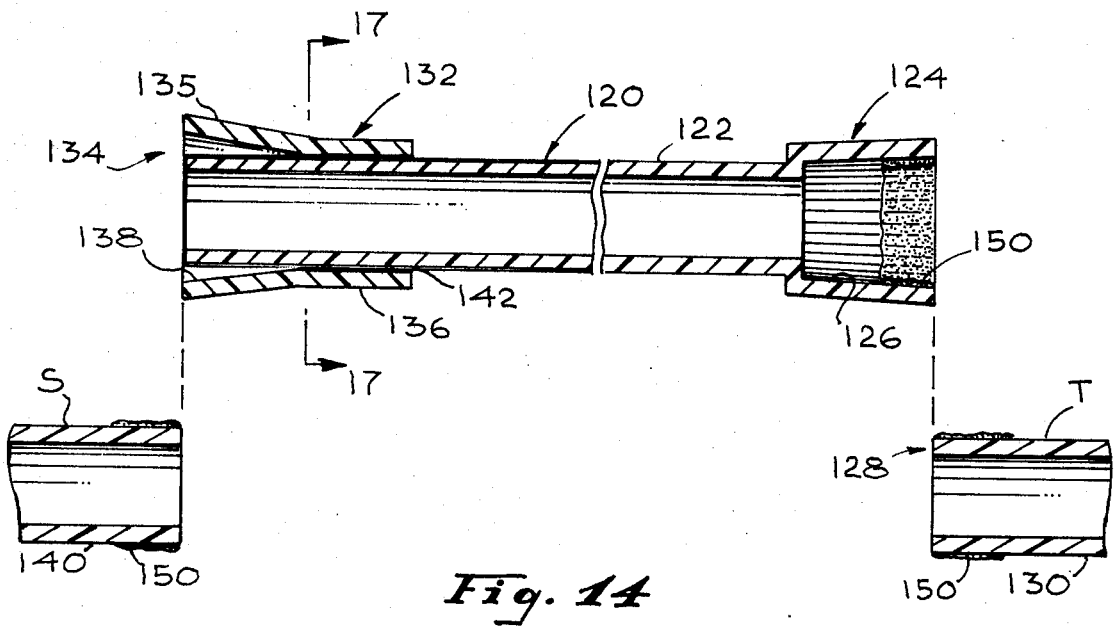
FIG. 14 is a sectional side view of an alternate assembly showing installation in a situation where substantially no bending of the emplaced pipes is possible.

FIGS. 1–13 hereof are identical to FIGS. 1–13 in applicant's parent application, now U.S. Pat. No. 3,857,588.

FIG. 1 illustrates a pair of couplings C and D of the prior art, showing how they are used to connect a replacement pipe section R to the ends of a pair of pipes S and T. This is accomplished by installing the coupling D to connect the two pipes R and T, and installing the other coupling C over an end of the pipe R, as shown. The mating surfaces of the couplings and pipes are made watertight by applying a suitable solvent cement thereto prior to insertion of the pipe ends into the couplings. Solvent cement is applied to the end of pipe S and to the interior of the free end of coupling C as illustrated in the figure. Considerable bending of the two pipes S and T is required to separate them sufficiently to permit insertion of the pipe S into the coupling C. Thereafter, the pipes are straightened to the positions at S' and C'. As a result of the bending and straightening, the pipes and couplings are somewhat distorted, thereby reducing the strength of the ultimate bond. In sprinkler systems wherein the pipes S and T were in the ground, considerable soil had to be removed to permit the required amount of bending.

FIG. 2 illustrates a coupling 10 which employs a forward end cap 12 that fits over the end of one pipe S, a rearward end cap 14 that fits over the end of another pipe R, and a sleeve 16 that can fit around the two end caps 12, 14 to securely hold them in alignment and therefore securely couple the pipes. The replacement pipe section R may be first connected to one pipe T with an ordinary coupling D, and the coupling assembly 10 of the present invention then may be used to connect the other end of the pipe R. Only a small amount of bending of one or both pipes S, T is required in order to install the first coupling D and to install the end caps and sleeve of the coupling assembly 10. The amount of bending required in the embodiment of FIG. 2 is much less than required in the prior art, so that very little, if any, additional soil must be removed around the pipes S, T to make a repair.

FIG. 3 illustrates details of the coupling assembly 10. The forward end cap 12 has a pipe portion 18 with an inside diameter slightly greater than the diameter of the pipe S, to fit snugly around the end of the pipe. The cap 12 also has an inwardly extending flange 20 that abuts the end of the pipe S to determine the position of the cap on the pipe, and a short tubular portion 22 that extends rearwardly beyond the pipe S and the flange 20. The cap 12 further has an outwardly extending flange 24 at its forward end. The rearward cap 14 also has a pipe portion 26 that closely surrounds the pipe R, an inwardly extending flange 28 at its forward end that abuts the end of the pipe R, and a short tubular portion 30 that extends forwardly beyond the pipe R and beyond the flange 28. The tubular portions 22, 30 of the two end caps are constructed to closely interfit, the tubular portion 22 of the forward cap being closely received in the tubular portion 30 of the rearward cap for alignment. It also may be noted that the rearward portion of the rearward cap is tapered at 32 on its outside.

The sleeve 16 has a length approximately equal to the combined lengths of the two end caps 12, 14, and it is designed to closely fit over them. The sleeve has a pipe portion 34 along most of its length that is closely received around the two end caps, and with a forward end 36 that nearly abuts the flange 24 on the forward cap. The sleeve also has a rearward portion 38 that is tapered along its inside to closely fit the tapered rearward portion 32 of the rearward cap.

The coupling assembly 10 is installed by first applying adhesive, such as a solvent cement, to the inside surfaces of the sleeve 16, and then slipping the sleeve onto the pipe R as illustrated in FIG. 2. No glue touches pipe R at this time. Adhesive is then applied to the ends of the pipes S and R, and the two end caps 12, 14 are then installed on the ends of their respective pipes S, R. The adhesive is then applied on the outside of the two caps 12, 14, except on the outside of the forward flange 24 of the forward cap. The short tubular portion 22 of the forward cap is inserted into the short tubular portion 30 of the rearward cap, which is easily done because of the short length of these tubular portions (their overlap is on the order of 1/64th inch). The sleeve 16 is then slid over the two end caps to the position illustrated in FIG. 3. The sleeve 16 is slid forwardly as far as possible, and is normally stopped by engagement of the tapered portions 32, 38 of the rearward cap and sleeve. It should be noted that the gluing surfaces are aligned and undistorted prior to sliding the sleeve 16 over the caps 12, 14.

The coupling assembly 10 provides a reliable pipe connection, because all parts are held along a considerable tubular length. Thus, the pipe portions 18, 26 of the two end caps are joined to their respective pipes S, R along a considerable surface area while the sleeve 16 is joined to the two end caps along a considerable tubular area. Also, in order for water to leak out, it would have to pass along a considerable tubular area where adhesive holds the parts together. The interfitting short tubular portions 22, 30 also aid in sealing. It may be noted that the male tubular portion 22 may be formed on the rearward cap 14 and the female tubular portion formed on the forward cap 12, instead of vice versa, if desired.

FIG. 5 illustrates the manner in which two pipe couplings 10a and 10b of the present invention can be utilized in a situation where essentially no bending of the emplaced pipes S and T is possible. Instead of using one ordinary coupling D of the prior art as illustrated in FIG. 2, two couplings of the present invention are employed at the opposite ends of the replacement pipe R. The installation of FIG. 5 is made by installing two forward end caps 12a, 12b on the two pipes S and T. Two sleeves 16a and 16b are installed on the pipe R and two rearward end caps 14a, 14b are installed on the ends of the pipe section R. The pipe section R is then dropped into alignment with the two pipes S, T and the sleeves are then slid into position.

FIG. 6 illustrates how a portion of the coupling assembly of the invention can be utilized to connect a replacement pipe W to a T-coupling (or L-coupling) Z of the prior art. The coupling Z is shown with a pipe end X broken off inside. The installation is made by attaching a rearward end cap 14 to the replacement pipe W, moving the forward end of the cap 14 against the T-coupling Z, and then sliding the sleeve 16 over the rear cap 14 and an end P of the coupling Z. The coupling end P is of the same outside diameter as the rearward cap 14, so that the coupling 16 is closely received thereon. Thus, the same coupling assembly can be utilized to connect to a T-coupling of the prior art, by eliminating the forward end cap.

FIG. 7 illustrates a coupling assembly 50 constructed in accordance with another embodiment of the invention, which utilizes only one end cap 52 and a sleeve 54. The cap 52 is similar to the forward end cap of the assembly 10, except that it has a female tubular portion 56 at its rearward end for directly receiving the end of the pipe R. Also, the cap 52 is tapered along the outside of its rearward portion 58. The sleeve 54 is similar to the sleeve of the coupling assembly 10, except that the taper at 60 occurs along a middle portion, and the rearward portion 62 is formed to closely receive the pipe R. The installation of the coupling assembly 50 is accomplished by applying adhesive to the inner surface of sleeve 54 and sliding the sleeve 54 over the pipe R. Adhesive is then applied around the ends of the pipe S. The end cap 52 is then installed on the end of the pipe S and with its tubular portion 56 receiving the end of the pipe R. Adhesive is then applied to the outside of cap 52 and pipe R, and the sleeve 54 is then slid forwardly over the cap 52.

FIGS. 8 and 9 illustrate a coupling 70 constructed in accordance with a further embodiment of the invention, which utilizes a highly flexible sleeve 72 and a pair of substantially rigid inserts 74, 76 at the ends of the sleeves. The sleeve 72 has sufficient flexibility so that it can be readily deformed by a person to the configuration illustrated in FIG. 9, to thereby shorten the length between the ends of the coupling. A variety of material such as a vinyl with considerable plasticizer can be utilized to achieve much flexibility. The sleeve 72 cannot be readily used alone because solvent cement, which is the most common type utilized in PVC sprinkler pipe repair, requires considerable time to bond to suitable highly flexible material. While the common more rigid PVC pipes can be bonded together with solvent cement in a time less than about 20 minutes, bonding of such rigid PVC to the highly flexible vinyl can require hours. The inserts 74, 76 minimize the bonding time, inasmuch as the inserts are constructed of ordinary rigid PVC. Also, the inserts are internally tapered to facilitate joining to another pipe. The inserts 74, 76 are installed, as with solvent cement, at the factory so that the longer bonding time is not a highly significant factor. A repairman installs the coupling 70 to replace a damaged pipe section, by cutting out the damage section to leave two pipe ends S and T. The coupling 70 is provided with markings 71 near either end thereof to serve as a gauge that indicates the required gap length. The repairman coats the ends of the pipe S and T and the insides of the inserts 74, 76 with solvent cement and then inserts one pipe T into one insert 76. He then deforms the sleeve 72 as to the configuration illustrated at 72a in FIG. 9 with his thumbs $T_r$ and $T_L$ and forefingers $F_r$ and $F_L$ to reduce the length of the coupling. The shortened coupling can then be inserted into the other pipe S and allowed to return to its cylindrical shape, so that it becomes longer while receiving the other pipe end S.

FIG. 10 illustrates a coupling 80 constructed in accordance with yet another embodiment of the invention, wherein a flexible sleeve 82 is utilized in conjunction with end inserts 84, 86 of harder material, in which the flexible sleeve is formed with a bellows portion 88. The flexible sleeve and inserts are of material similar to those described in the coupling of FIGS. 8 and 9. The bellows portion 80 makes compression of the length of the sleeve even easier.

FIGS. 11–13 illustrate a still further embodiment of the invention, wherein the coupling 90 includes a pair of half-cylindrical parts 92, 94 that can be fitted together over the ends of pipes S, T. The two parts 92, 94 are identical, and each extend slightly more than 180° and has serrated sides 96, 98 or 100, 102. Each part 92, 94 is substantially one of the halves of a pipe cut along an imaginary plane P that extends through the axis 95 of the pipe. The serrated sides of the two parts interfit and serve to hold the parts together while solvent cement dries thereon. Both parts may be constructed of an ordinary largely rigid vinyl that can be rapidly solvently cemented to PVC pipes. The coupling 90 is installed by applying solvent cement to the serrated sides 96–102 of the half-cylindrical parts, as well as to the inside surfaces thereof and to the outside surfaces of the ends of the pipes S and T. The two coupling parts 92, 94 are then placed on opposite sides of the pipes and pressed together so that their serrated sides 98–102 interfit. The coupling parts can be even more securely held together by means of a clamp 104 illustrated in FIG. 13 which is removed after the solvent cement has at least partially dried.

FIG. 14 illustrates a further embodiment of a coupling 120 useful in situations of the type depicted in FIG. 5, where essentially no bending of the emplaced pipes S and T is possible. The coupling 120 is comprised of a pipe section 122 which has an outer diameter smaller than the diameter of the emplaced pipes S and T.

An enlarged tubular portion 124 is formed on a first end of the pipe section 122. The tubular portion 124 has a slightly tapered inner wall 126 adapted to be fitted over and adhered to the open end 128 of emplaced pipe T. The diameter of the tapered inner wall surface 126 extends from a dimension greater than the outer diameter of the pipe T to a dimension smaller than the outer diameter of the pipe T. Thus, when the pipe section 122 is aligned with the pipe T and moved to the right, as depicted in FIG. 14, the surface 126 will closely mate with the outer surface 130 of the pipe T.

A sleeve 132 is mounted for slidable movement on the pipe section 122 adjacent a second end 134. The sleeve 132 includes an outwardly flared portion 134 and a substantially cylindrical portion 136. The flared portion 134 includes a tapered inner surface 138 adapted to fit over and engage the outer surface 140 of emplaced pipe S. More particularly, the tapered surface 138 extends from a dimension greater than the outer diameter of the pipe S to a dimension smaller than the outer diameter of the pipe S.

The portion 136 includes a surface 142 whose inner diameter is only slightly greater than the outer diameter of the pipe section 122. Thus, the sleeve 132 is able to slide on the pipe section 122, but with very little clearance.

The coupling 120 is useful for repairing a damaged pipe section between the illustrated emplaced pipes S and T where it is substantially impossible to bend the pipes S and T. In order to repair the damage, initially a length of pipe substantially equal to the total length of pipe section 122 is removed from between the pipes depicted in FIG. 14 as S and T. Then, a suitable adhesive 150 is respectively applied to the tapered surface 126 and outer surface of the pipe T. The coupling 122 is then moved into alignment with the pipes S and T and the pipe section 122 is moved to the right, as depicted in FIG. 14, in order to engage and adhere the surface 126 of coupling 120 to the surface 130 of pipe T.

Figure 15:
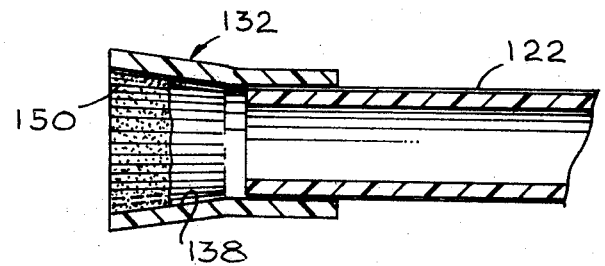
FIGS. 15 and 16 are side sectional views of the assembly of FIG. 14 depicting a preferred manner of installation.
Figure 16:
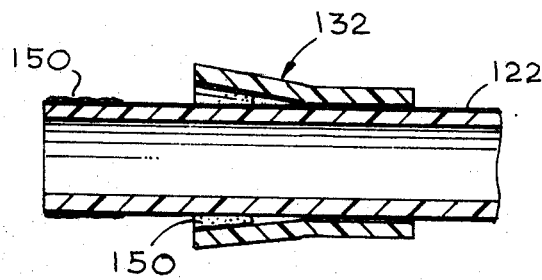

Additionally, adhesive 150 is applied to the tapered inner surface 138 as depicted in FIG. 15. The sleeve 132 is then slid to the right as shown in FIG. 16. Since the outer diameter of pipe section 122 is smaller than the outer diameter of pipe S, there is sufficient clearance between sleeve surface 138 and pipe section 122 to permit the sleeve 132 to be moved to the right without spreading the adhesive on the surface 138 against pipe section 122. Adhesive is then applied to the outer surface of the pipe section 122 adjacent the end 134 and to the external surface of the emplaced pipe S. Thereafter, the sleeve 132 is slid to the left so that the surface 142 on cylindrical portion 136 contacts and spreads the adhesive on the external surface of the pipe section 122. Additionally, the adhesive on the surface 138 of sleeve 132 will contact and adhere to the adhesive on the external surface of pipe S to create a permanent bond therebetween.

Although FIG. 14 illustrates the coupling 120 as utilizing a sleeve whose flared portion 135 has an inner surface 138 dimensioned to engage the external surface 140 of pipe S, the same coupling 120 could be utilized to mate with a conventional T or elbow by utilizing a sleeve 132 having a tapered surface 138 of larger diameter. That is, in FIG. 14, the free open end of a T or elbow could be situated where pipe S is depicted in FIG. 14. Since the outer diameter of the conventional T or elbow is greater than the outer diameter of the pipe S, the sleeve 132 would have to be provided with a larger inner diameter 138 in order to properly mate and adhere thereto.

Figure 17:
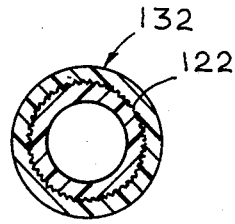
FIG. 17 is a sectional view taken substantially along the plane 17—17 of FIG. 14.

In accordance with a further feature of the invention, striations are preferably formed on the outer surface of pipe section 122 adjacent the end 134. Additionally, mating striations are also formed on the inner surface 142 of sleeve portion 136. The provision of mating striations, as is well depicted in FIG. 17, provides an increased surface area over which adhesive can be applied. As a consequence, greater adhesive bonding is achieved resulting in a more rigid damage resistant structure. Additionally, striations may be provided on the inner surfaces 126 and 138 of the tubular portion 124 and sleeve 132.

Although particular embodiments of the invention have been described and illustrated herein, it is recognized that modifications and variations may readily occur to those skilled in art and consequently it is intended that the claims be interpreted to cover such modifications and equivalents.

The embodiments in which an exclusive property or privilege is claimed are defined as follows:

1. A coupling for joining first and second pipes having open ends spaced from one another by a predetermined distance, said coupling comprising:

a pipe section including an elongated portion having an outer diameter smaller than the outer diameter of said first and second pipes;

said pipe section having a total length substantially equal to said predetermined distance and further including an enlarged tubular portion formed on a first end thereof, said tubular portion defining an inner surface having a diameter slightly larger than the outer diameter of said first pipe for adhesive mounting on said first pipe; and a sleeve slidable along said pipe section elongated portion having a substantially smooth internal surface including a first portion having a diameter slightly larger than the outer diameter of said pipe section elongated portion for axial sliding movement of said sleeve therealong and for adhesive mounting thereto and a second portion having a diameter slightly larger than the outer diameter of said second pipe for adhesive mounting thereto, said sleeve having a substantially smooth external surface free of securing means;

said sleeve second portion internal surface being tapered such that its diameter decreases from its free end toward said sleeve first portion from a diameter slightly greater than the outer diameter of said second pipe to a diameter slightly smaller than the outer diameter of said second pipe.

2. The pipe coupling of claim 1 wherein the outer surface of said pipe section elongated portion has striations formed therein; and wherein the internal surface of said sleeve first portion has striations formed therein.

* * * * *